United States Patent [19]

Adachi

[11] Patent Number: 4,811,242
[45] Date of Patent: Mar. 7, 1989

[54] CHINESE CHARACTER PRINTER CONTROLLING DEVICE

[75] Inventor: Shigeru Adachi, Hyogo, Japan

[73] Assignee: Mitsubishi Denki Kabushiki Kaisha, Tokyo, Japan

[21] Appl. No.: 18,431

[22] Filed: Feb. 25, 1987

[30] Foreign Application Priority Data

Apr. 25, 1986 [JP] Japan ................................. 61-94799

[51] Int. Cl.⁴ ............................ G06F 3/09; B41J 27/08
[52] U.S. Cl. ....................................... 364/519; 400/61; 364/523
[58] Field of Search ...................... 364/519, 523; 400/3, 400/4, 5, 12, 22, 61, 65, 70, 279; 346/139 R

[56] References Cited

U.S. PATENT DOCUMENTS 4,623,978 11/1986 Aoki ..................................... 364/519
4,661,000 4/1987 Shinbori ........................... 364/519 X
4,710,886 12/1987 Heath .................................. 364/519

FOREIGN PATENT DOCUMENTS 54-94883 7/1979 Japan .

Primary Examiner—Gary V. Harkcom
Assistant Examiner—H. R. Herndon
Attorney, Agent, or Firm—Bernard, Rothwell & Brown

[57] ABSTRACT

A controller for a Chinese character printer, or the like, includes a pattern buffer into which character pattern data is written by an input control unit transferring the character pattern data from a temporary input buffer. The character pattern data is transferred from the character pattern buffer into a font memory by an output control unit only during a non-printing period, such as during a paper feed, of the printer. Print data, including character codes, are transferred by the input control unit from the input buffer to a page buffer. During a printing period, the output control unit selects character pattern data in the font memory in accordance with the character codes in the page buffer and transfers the corresponding character pattern data to a pattern converting unit which sends appropriate print signal data based on the character pattern data to the printer.

5 Claims, 6 Drawing Sheets

CHINESE CHARACTER PRINTER CONTROLLING DEVICE

BACKGROUND OF THE INVENTION

1. Field of the Invention

This invention relates to a controlling device for controlling a Chinese character printer which prints characters, particularly Chinese characters, on print paper, and more particularly to a controlling device which controls a Chinese character printer such that while the printer is not performing printing, a character pattern may be written into a font memory in order to allow an input process to be performed without a delay from an output process to allow the printer to perform printing without the necessity of waiting.

2. Description of the Prior Art

Generally, a printer which prints information processed by a processing unit or the like as characters, numerals and marks on print paper is used as one of peripheral equipments of various computers. Such a printer can print various characters, but particularly a printer which has a function to print Chinese characters, there is a problem a little different from a printer for the exclusive use for alphabetic characters, numerals and marks due to the large of the number of Chinese characters. FIG. 1 is a block diagram showing a controlling device which is applied to a conventional Chinese character printer. Referring to FIG. 1, reference numeral 1 denotes a host computer, 2 a temporary storage buffer for temporarily storing therein print data and character patterns received from the host computer 1, 3 an unregistered character code table for storing therein unregistered character codes within the temporary storage buffer 2, 4 a character pattern registration check table for storing therein information regarding whether or not a character pattern is registered, 5 a page buffer for storing print data therein, 6 a font memory for storing character patterns therein, 7 a printer, and 8 a pattern converting unit for receiving a character pattern via an output controlling unit 10 and for delivering the received character pattern to the printer 7.

Reference numeral 9 denotes an input controlling unit. The input controlling unit 9 reads contents of the temporary storage buffer 2, and, if the contents are print data, then it studies a character code of the print data with the character pattern registration check table 4 and if the character code is not yet registered, the input controlling unit 9 sets the character code into the unregistered character code table 3 and writes the print data into the page buffer 5. To the contrary, if the contents of the temporary storage buffer 2 are a character pattern, then the input controlling unit 9 rewrites contents of a cell of the character pattern registration check table 4 corresponding to the character as registered and then writes the character pattern into the font memory 6.

Reference numeral 10 denotes an output controlling unit which reads out print data from the page buffer 5 and transfers the print data thus read out to the pattern converting unit 8.

FIG. 2 is a detailed view of the unregistered character code table 3. Referring to FIG. 2, reference symbols $3a$ to $3n$ individually denot n unregistered character codes, and reference symbol $3x$ denotes an empty cell of the unregistered character code table 3.

FIG. 3 is a detailed view of the character pattern registration check table 4, and in FIG. 3, reference symbols $4a$ to $4n$ indicate corresponding relationships to character codes, and the contents "0" represent "unregistered" and "1" represent "registered".

FIG. 4 is a detailed view of the page buffer 5. Referring to FIG. 4, reference symbol 51 denotes a write address register, 52 a read-out address register, "5w" a write address, "5r" a read-out address, 53 an empty area, 54 an area in which print data are present, $54a$ a character code.

FIG. 5 illustrates information stored in the temporary storage buffer 2, and in FIG. 5, reference symbol $2a$ denotes an area in which print data are stored, $2b$ an area in which a character pattern is stored, reference symbols $2a_1$ to $2a_n$ denote each a character code within the print data area $2a$, reference symbol $2b_1$ denotes a character code within the character pattern area, and $2b_2$ a pattern of a character within the character pattern.

FIG. 6 illustrates results of printing, and in FIG. 6, references symbol $7a$ denotes a zone in which patterns are printed, and $7b$ a zone in which no pattern is printed and only paper feeding is effected.

Now, operation of the controlling unit will be described. At first, input operation will be described.

If a notice is received from the host computer 1, the input controlling unit 9 delivers print data and character patterns received from the host computer 1 to the temporary storage buffer 2 and then effects following operations individually for the print data and the character patterns.

In case of the print data, character codes $2a_1$ to $2a_n$ within the temporary storage buffer 2 are read out one after another therefrom and are then checked whether or not they are already registered with the character pattern registration check table 4. In particular, if contents i of a cell of the character pattern registration check table 4 corresponding to a character code $4n$ are "0", then it is determined that the character pattern is not yet registered, and on the contrary if contents i are "1", then it is determined that the character pattern is already registered. Here, such a character which is not yet registered is registered into the unregistered character code table 3.

Then, the input controlling unit 9 writes the contents of the temporary storage buffer 2 into cells of of the page buffer 5 beginning with that one of cells which is designated by the write address register 51 and then updates contents of the write address register 51.

After completion of the processes described above, the input controlling unit 9 delivers contents of the unregistered character code table 3 to the host computer 1.

Normally, the host computer 1 delivers character patterns for the characters corresponding to the contents within the unregistered character code table 3 to the Chinese character printer controlling device.

Thus, in case a character pattern is received from the host computer 1, the input controlling unit 9 at first fetches the character code $2b_1$ of the character pattern from the temporary storage buffer 2 and rewrites contents of a cell of the character pattern registration check table 4 corresponding to the character to "1".

Then, the input controlling unit 9 transfers the pattern $2b_2$ from the temporary storage buffer 2 to the font memory 6.

Through the operations described above, the print data within the print data area $2a$ are written into the page buffer 5 and the character pattern within the character pattern area $2b$ is written into the font memory 6.

Now, outputting operation will be described mainly with respect to operation of the output controlling unit 10. The output controlling unit 10 fetches a character code 54a from a cell of the page buffer 5 designated by the address register 52 and then fetches a corresponding pattern from the font memory 6 and delivers it to the pattern converting unit 8.

The pattern converting unit 8 re-arranges the pattern received from the output controlling unit 10 and delivers it to the printer 7. Details of the operation of the pattern converting unit 8 are omitted herein because they have no direct relation to the scope and spirit of the present invention.

The output controlling unit 10 repeats such a series of operations with the read-out address register 52 for the page buffer 5 updated for each repetition.

In this manner, printing is effected in accordance with the print data stored in the page buffer 5.

However, since the conventional controlling device for a Chinese character printer has such a construction as described above, during outputting operation of the controlling device wherein outputting is being conducted from the pattern converting unit to the printer, writing into the font memory as an input process operation cannot be performed and hence input process becomes delayed relative to output process. As a result, there is a problem that output printing is delayed and hence the printing speed becomes low, resulting in deterioration in printing capacity of the printer.

SUMMARY OF THE INVENTION

The object of the present invention resides in provision of a controlling device for a Chinese character printer wherein the input process is not delayed relative to the output process to allow a rise of the printing speed and improvement in the printing capacity of the printer.

In order to attain the object, according to the present invention, a controlling device for a Chinese character printer comprises a pattern buffer for storing a character pattern therein, whereby a character pattern is written into the pattern buffer during the input process operation and then while a paper feeding operation is being performed without being accompanied by printing during the output process operation, the character pattern stored in the pattern buffer is written into a font memory.

DETAILED DESCRIPTION OF THE PREFERRED EMBODIMENT

Now, a preferred embodiment of a controlling device for a Chinese character printer according to the present invention will be described in detail with reference to the accompanying drawings.

Figure 1:
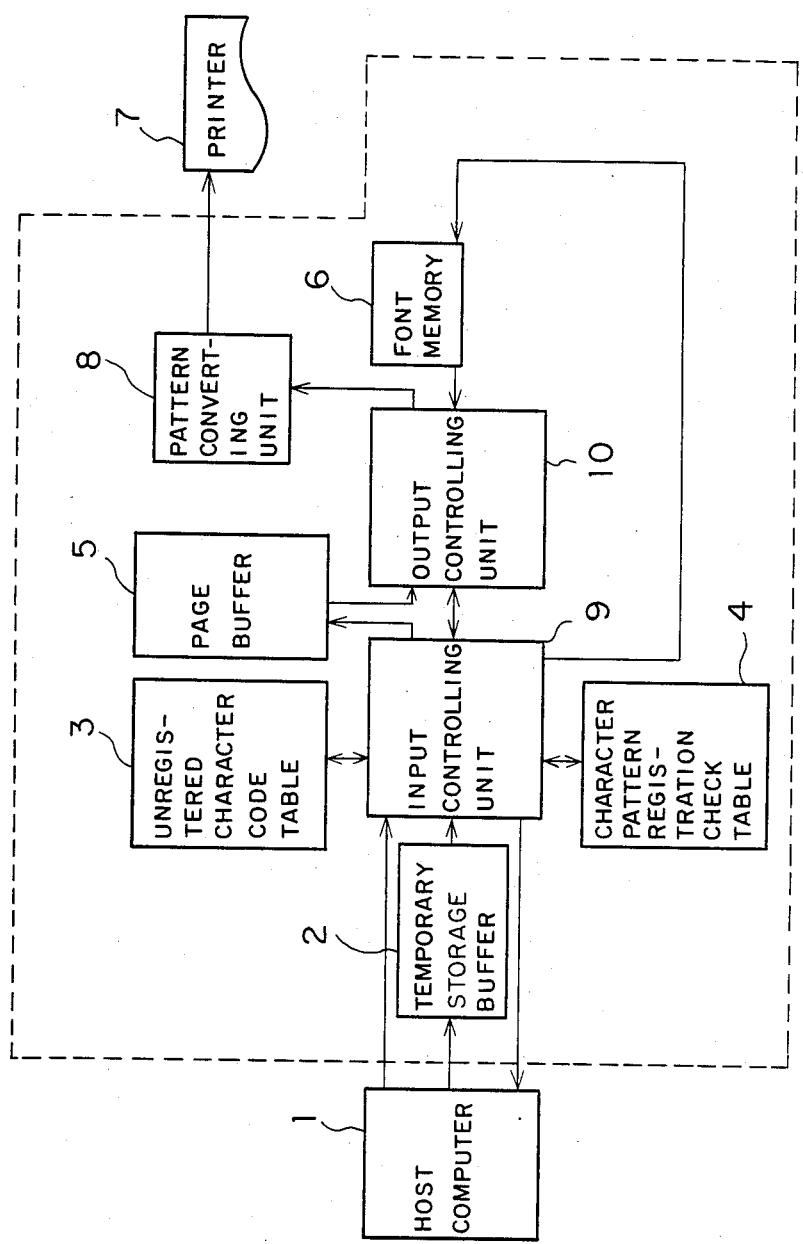
FIG. 1 is a block diagram illustrating general construction of a typical one of conventional controlling devices for a Chinese character printer.
Figure 2:
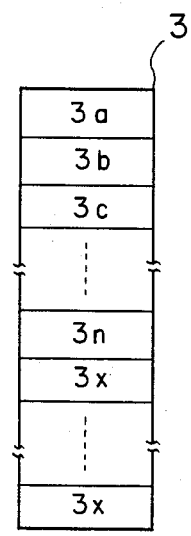
FIG. 2 is a block diagram illustrating details of an unregistered character code table.
Figure 3:
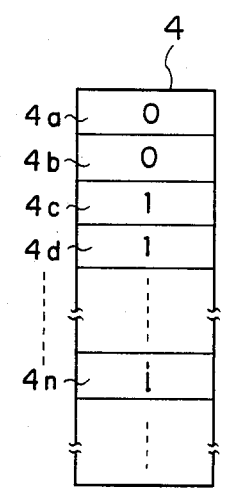
FIG. 3 is a block diagram illustrating details of a character pattern registration check table.
Figure 4:
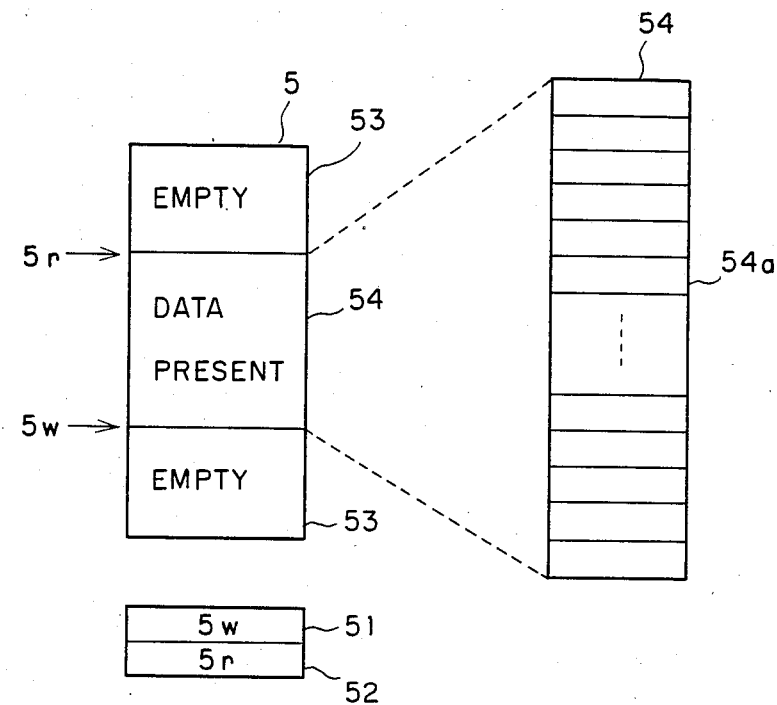
FIG. 4 is a block diagram illustrating a page buffer.
Figure 7:
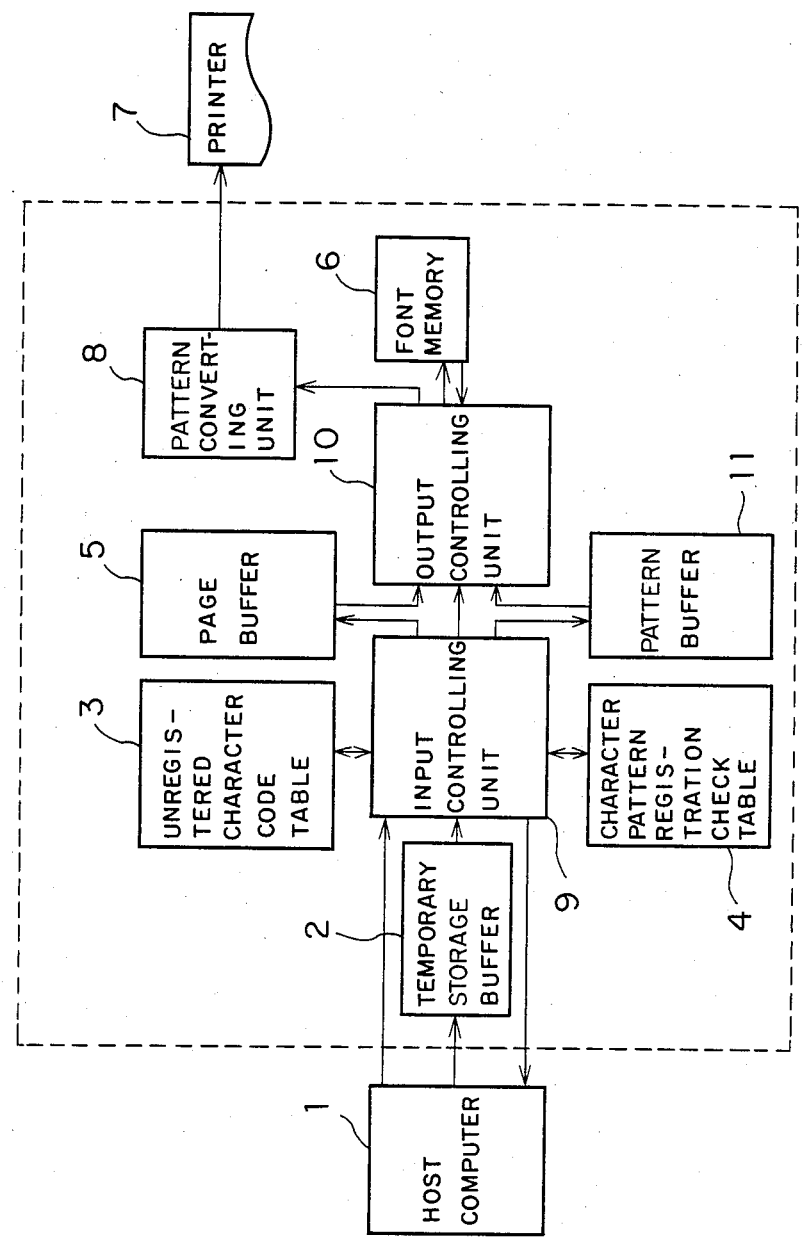
FIG. 7 is a block diagram illustrating an embodiment of a controlling device for a Chinese character printer according to the present invention.
Figure 8:
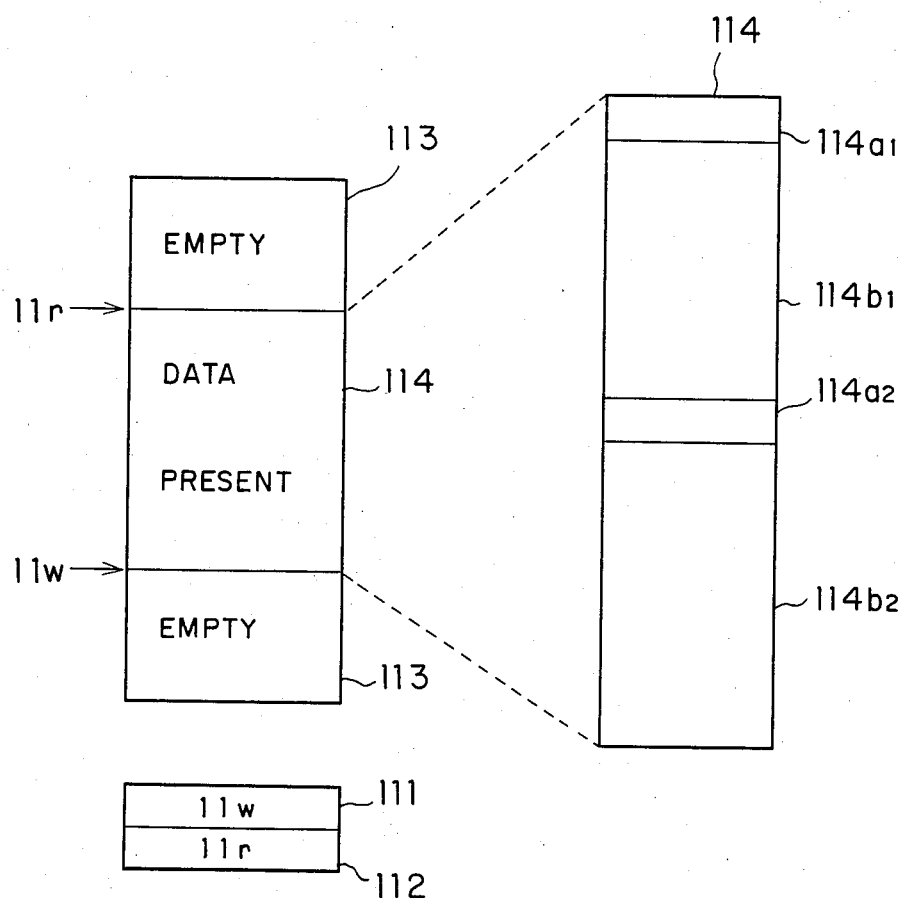
FIG. 8 is a block diagram illustrating details of a pattern buffer of the device of FIG. 7 in which data are stored.

Referring to FIG. 7 which is a block diagram illustrating construction of an embodiment of the invention, reference numerals 1 to 10 denote like or corresponding elements or components to those described hereinabove in conjunction with the conventional controlling device with reference to FIG. 1, and hence description thereof is omitted herein to avoid redundancy. In FIG. 7, reference numeral 11 denotes a patter buffer for storing a character pattern therein, which is newly added to the controlling device in accordance with the present invention. FIG. 8 is a view illustrating details of the pattern buffer 11, and in FIG. 8, reference symbol 111 denotes a write address register, 112 a read-out address register, "$11w$" a write address, "$11r$" a read-out address, 113 an empty area, 114 a print data area, and reference symbols $114a_1$, $114a_2$, $114b_1$ and $114b_2$ each denot a section of the print data area 114 of the pattern buffer 11 in which data regarding an individual character pattern are stored.

Now, operation will be described. At first, inputting operation will be described mainly with respect to operation of the input controlling unit 9.

Figure 5:
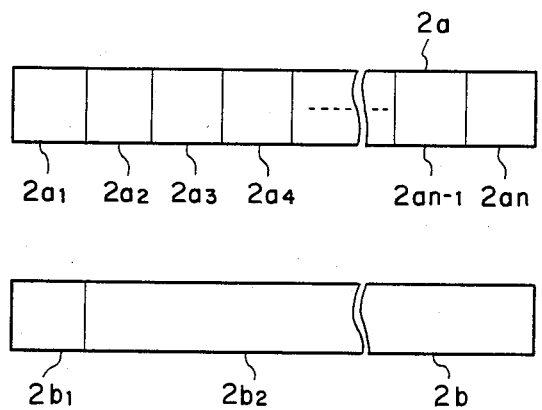
FIG. 5 is a block diagram illustrating a temporary storage buffer in which print data and a character pattern are stored.
Figure 6:
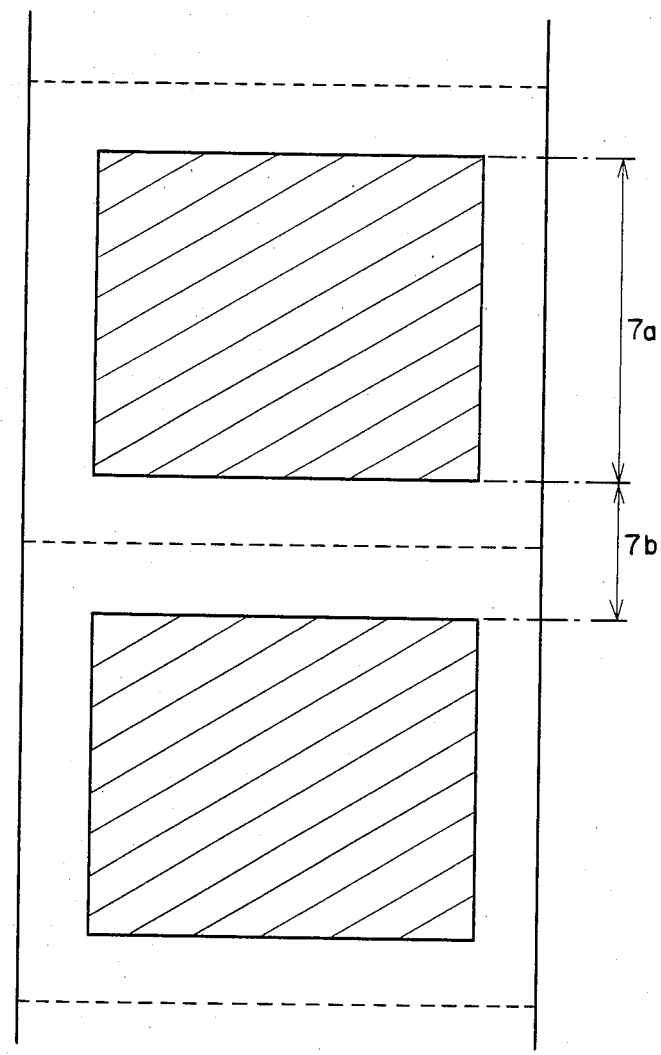
FIG. 6 is a schematic illustration showing results of printing by a printer.

In case input data received from a host computer 1 is a print data, the controlling device operates in a similar manner to that of the conventional device described hereinabove in conjunction with FIG. 5.

Meanwhile, in case input data received from the host computer 1 is a character pattern, the input controlling unit 9 first fetches a character code $2b_1$ of the character pattern from a temporary storage buffer 2 and rewrites contents of a cell of a character pattern registration check table 4 corresponding to the character to "1".

Then, the input controlling unit 9 writes a character pattern $2b_2$ of the character pattern within the temporary storage buffer 2 into cells of the pattern buffer 11 beginning with a cell designated by the write address register 111 and then updates contents of the write address register 111.

With the operations described above, the print data stored in the print data area 2a of the temporary storage butter 2 are written into the page buffer 5, and the character pattern stored in the character pattern area 2b is written into the pattern buffer 11.

Now, output operation will be described mainly with respect to operation of the output controlling unit 10. The output controlling unit 10 fetches a character pattern from a cell of the pattern buffer 11 designated by the read-out address register 112, then writes the character pattern into the font memory 6, and updates contents of the read-out address register 112 until the updated contents of the read-out address register 112 are determined by the output controlling unit to coincide with the contents of the write address register 111.

Subsequently, the output controlling unit 10 delivers the contents of the page buffer 5 to a pattern converting unit 8 in order to effect printing in a similar manner to that of the conventional controlling device described hereinabove.

Then, after initiation only of a paper feeding operation after completion of the preceding printing operation, the output controlling unit 10 repeats to fetch a character pattern from the pattern buffer 11 and write the character pattern into the font memory 6 until the contents of the read-out address register 112 and the write address register 111 coincide with each other. Normally, an interval of time while all the stored character patterns are fetched from the pattern buffer 11 and written into the font memory is shorter than an interval of time while only paper feeding is being performed.

It is to be noted that while the embodiment described above relates to an example in which a character pattern is stored into a pattern buffer, similar effects can be attained otherwise if graph data or image data are to be stored into a graph buffer or an image buffer.

As apparent from the foregoing description, according to the present invention, a character pattern is written into a pattern buffer, and then while paper is being fed without being accompanied by printing, the character pattern is read out from the pattern buffer and written into a font memory. Accordingly, a controlling device for a Chinese character printer can be obtained wherein the input process is not at all delayed relative to the output process and hence printing is not delayed.

What is claimed is:

1. A controlling device for a Chinese character printer, comprising:
   a temporary storage buffer for temporarily storing therein print data and character pattern data received from a host computer;
   a character pattern registration check table provided for studying whether or not a character code of a print data received from the host computer is registered as a character pattern and for setting the character corresponding to a character pattern received from the host computer as registered;
   an unregistered character code table for registering therein a character code of the received print data as a character pattern when the character code is not yet registered;
   a page buffer for receiving and storing print data including character codes of a page to be printed;
   an input controlling unit for reading out stored contents of said temporary storage buffer and for controlling such that in case the read out contents are a print data, a character code of the print data is checked with said character pattern registration check table and in case the character code is not yet registered, the character code is registered into said unregistered character code table, and then the print data is stored into said page buffer;
   a font memory for receiving and storing character patterns corresponding to character codes to be printed;
   an output controlling unit for reading out print data from said page buffer and for successively reading out character patterns from said font memory in accordance with character codes of the thus read out print data from said page buffer;
   a pattern converting unit for receiving and re-arranging the character patterns from said output controlling unit and for delivering the re-arranged character patterns to the printer; and
   a pattern buffer into which a character pattern is written by said input controlling device while said input controlling device is performing an input process and from which a character pattern written therein is read out by said output controlling device and written into said font memory while the printer is not performing a character pattern printing operation.

2. A controlling device for a Chinese character printer according to claim 1, wherein a character pattern to be used for a print data is written into and read out from said font memory via said output controlling unit.

3. A controlling device for a Chinese character printer according to claim 1, wherein said pattern buffer includes a write address register for storing therein address data in accordance with which said input controlling unit writes a next character pattern into said pattern buffer, and a read-out address register for storing therein address data in accordance with which said output controlling unit reads out a next character pattern from said pattern buffer, whereby the writing into said font memory by said output controlling unit is terminates when said write address register and said read-out address register coincide with each other.

4. A controlling device for a Chinese character printer according to claim 3, wherein contents of said read-out register are updated by said output controlling unit.

5. A controlling device for a Chinese character printer according to claim 3, wherein said output controlling unit checks coincidence of contents of both of said read-out address register and said write address register with each other and until both of the contents are found to coincide with each other, said output controlling unit reads out a character pattern from said pattern buffer and writes the character pattern thus read out into said font memory.

* * * * *